Aug. 26, 1958 W. H. DOHERTY 2,848,742
SHOE BOTTOMING METHODS AND APPARATUS
Filed March 10, 1954 4 Sheets-Sheet 4
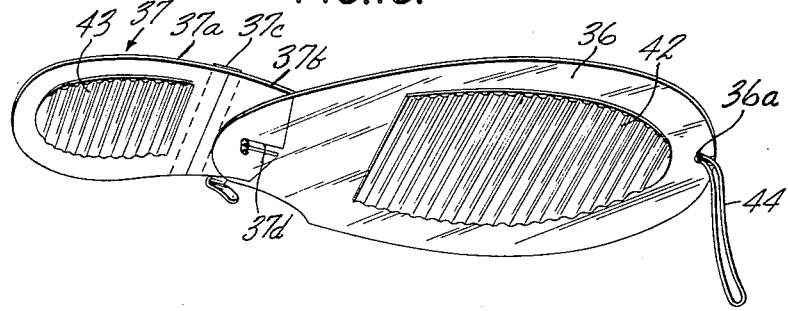
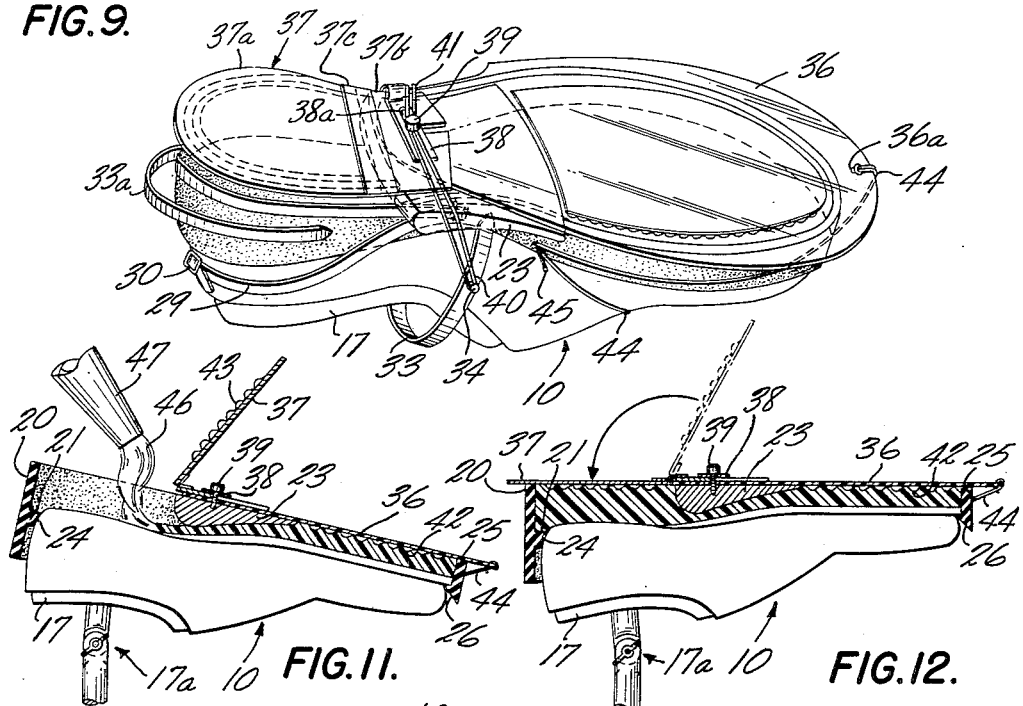
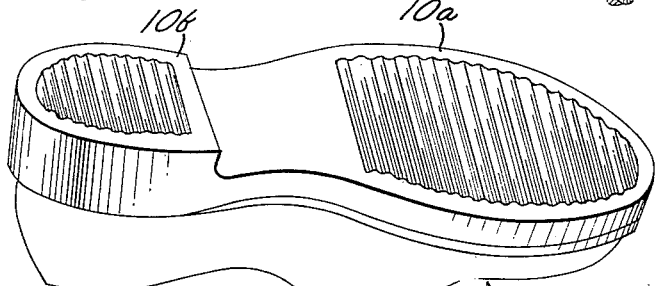
INVENTOR.
WILLIAM H. DOHERTY
BY
Campbell, Brumbaugh, Free & Graves
his ATTORNEYS United States Patent Office 2,848,742
Patented Aug. 26, 1958

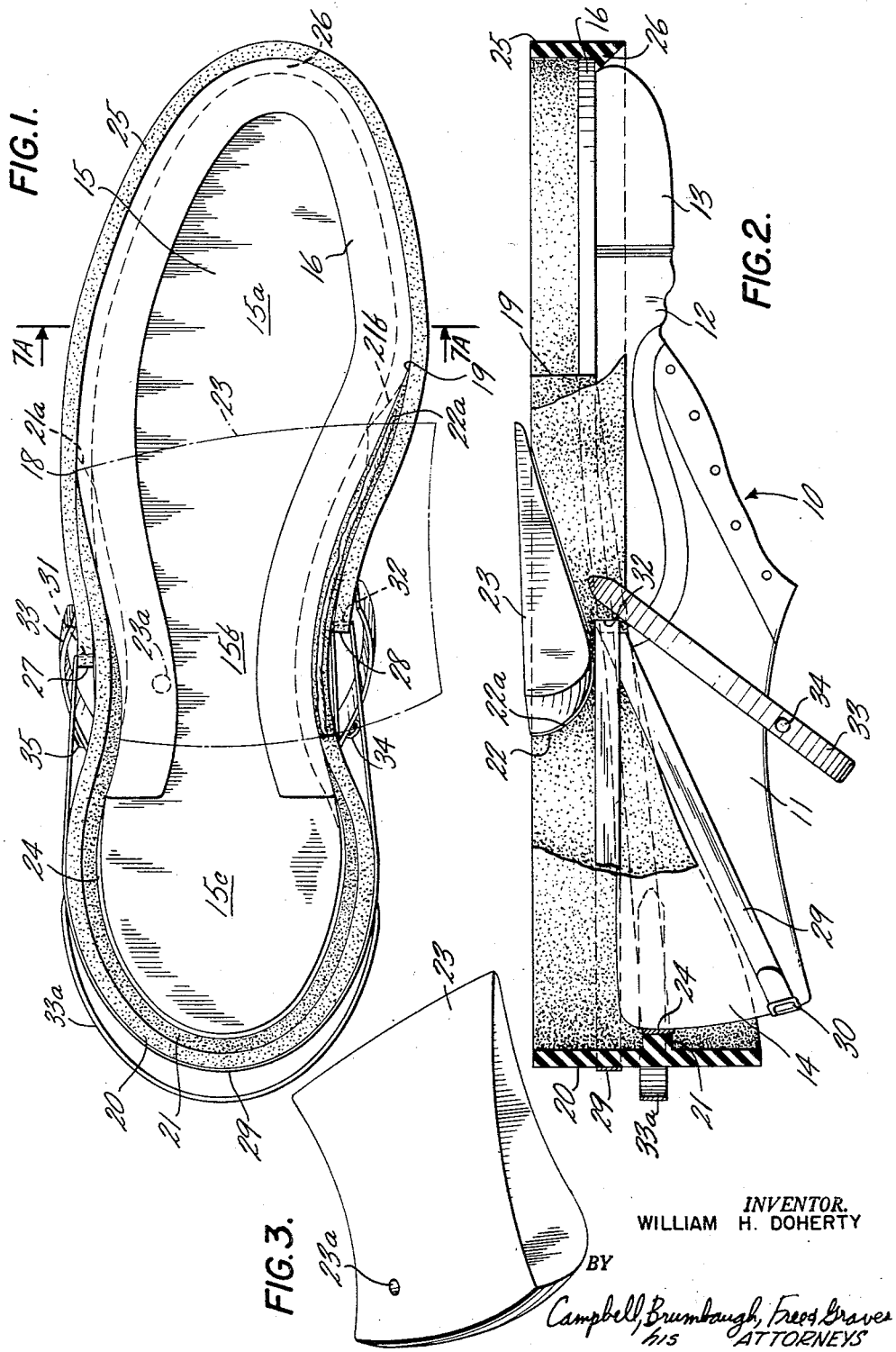

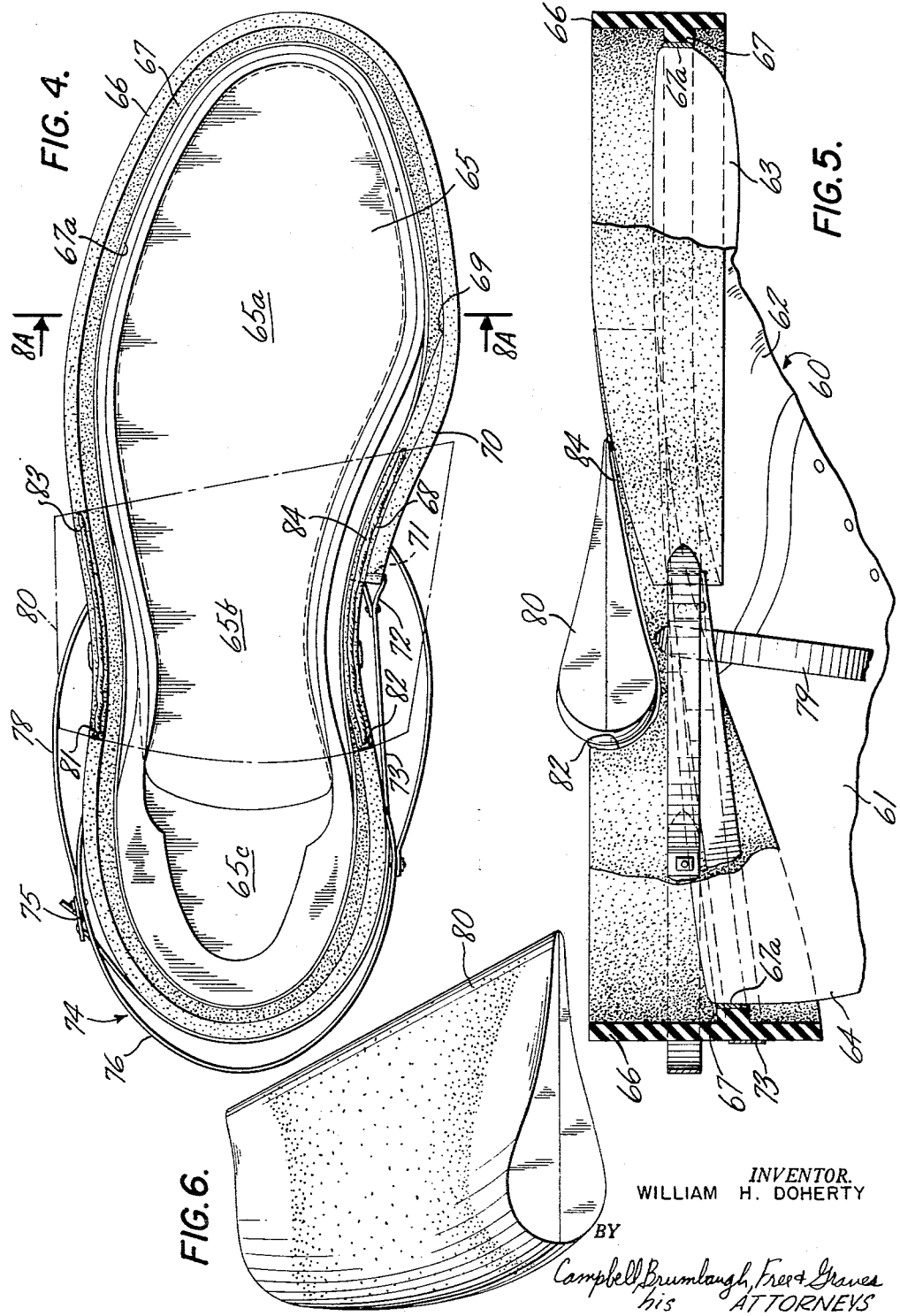

2,848,742

SHOE BOTTOMING METHODS AND APPARATUS

William H. Doherty, Rego Park, N. Y.

Application March 10, 1954, Serial No. 415,283

19 Claims. (Cl. 18—34)

This invention relates to methods and apparatus for directly molding soles and heels on footwear.

One of the costly steps in manufacturing or repairing shoes involves the attachment thereto of a sole and a heel. This has been accomplished in the past chiefly by sewing and tacking methods, and it has been necessary to preform these members before permanently joining them to the shoes. Therefore, a great number of different sized soles and heels must be stocked in order to fit the various sizes and types of shoes.

Accordingly, it is an object of the present invention to provide methods and apparatus for molding soles and heels on new or used footwear.

It is another object of the invention to provide resilient banding for forming a mold on the shoe bottom which may be employed with suitable casting compounds to form the soles and heels.

It is a further object of the invention to provide methods and apparatus for molding soles and heels on welted or unwelted footwear.

These and further objects of the invention are accomplished by clamping resilient band means to the shoe along the lower periphery thereof and extending beyond the shoe bottom. By cutting away a section in the band means adjacent to the shoe shank, a core may be positioned to form a shank portion in the molded shoe sole.

In one embodiment of the invention, two molding bands are provided, one band extending around the sole and one around the heel of the shoe. The bands are suitably formed and tapered to smoothly overlap and form a tight mold. It may be desirable in some instances to provide a shoulder on the inner face of these bands to hold them in position under the welt on a welted shoe or to provide soles and heels with a welt-like construction on an unwelted shoe.

In another embodiment of the invention, a single molding band is disposed around the shoe periphery extending beyond the shoe bottom. If desired, this band may also be formed with a shoulder for the purpose described in connection with the first embodiment of the invention.

Further, adhesive means may be inserted between the bands and the shoe to provide a tight seal and prevent slippage of the bands. Also, clay may be placed on the cut away section of the band to fill in any irregularities between the core and the band.

With the molding bands and core in position on the shoe bottom, a bonding and filler compound may be applied to the shoe bottom after it has been appropriately roughened. Following the partial setting of this compound, a suitable casting compound is poured into the mold formed in the bottom of the shoe, and covers having tread formers affixed thereto are lowered onto the casting compound.

In order to compensate for any shrinkage of the casting compounds, the upper faces of the molding bands may be beveled to permit a greater volume of the compound to be poured into the mold. While setting, the sole and heel will shrink to normal size.

These and further objects and advantages of the invention will be more readily understood when the following description is read in connection with the accompanying drawings in which:

Figure 1 is a plan view of a band mold in position on a welted shoe in accordance with the invention;

Figure 2 is an elevation view partially broken away, of the mold and shoe illustrated in Figure 1;

Figure 3 is a view in perspective of a core that may be employed with the band mold of Figures 1 and 2;

Figure 4 is a plan view of a band mold in position on an unwelted shoe comprising a further embodiment of the invention;

Figure 5 is a view in elevation, partially broken away, of the mold and shoe illustrated in Figure 4;

Figure 6 is a view in perspective of a further core that may be employed with the band mold illustrated in Figures 4 and 5;

Figure 9 is a perspective view of a shoe illustrating the elements employed in molding a sole and heel thereon in accordance with the invention;

Figure 10 is a perspective view of a tread former shown in Figure 9;

Figure 11 is an elevation view partially in section showing a shoe provided with a band mold undergoing a step in the molding process in accordance with the invention;

Figure 12 is an elevation view partially in section and similar to Figure 11 illustrating a further step in the molding process; and Figure 13 is a view in perspective of a shoe provided with a finished sole and heel formed by the methods and apparatus of the present invention.

Figure 7A:
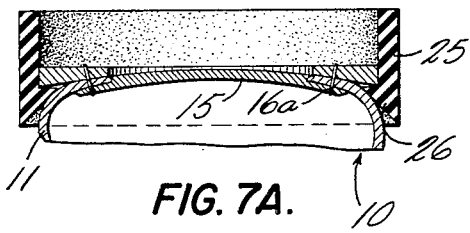
Figure 7A is a transverse section of the mold and shoe taken on the line 7A—7A in Figure 1 looking in the direction of the arrows.

Referring to the drawings in greater detail with particular reference to Figures 1 to 3 and 7A, a conventional shoe 10 formed by an upper 11, a vamp 12, a cap 13, a counter 14, an insole 15 having front, shank and heel portions 15a, 15b and 15c, and a welt 16 is preferably supported in any conventional manner such as, for example, by a shoe tree or last 17 as shown in Figures 11 and 12. The insole 15, upper 11 and welt 16 are joined by stitching 16a as illustrated in Figure 7A.

Designed to extend from a position 18 adjacent to the outside forward end of the shank portion 15b around the heel portion 15c to a position 19 on the inside of the shoe 10 adjacent to the forward end of the shank portion 15b is a heel molding band 20. A shoulder 21, formed on the heel band 20 to engage the counter 14 as clearly shown in Figure 2, is formed with sections 21a and 21b tapering into the band 20 on the outside and inside, respectively, of the shoe 10 adjacent to the shank portion 15b as indicated in Figure 1, the band 20 also being tapered to a point at both of the positions 18 and 19. The band 20 is extended below the shoulder 21 for greater rigidity, such extension being unnecessary in some instances.

The band 20 is provided with a cut away section 22 on the inside of the shoe 10 adjacent to the shank portion 15b in order to receive, as shown in phantom outline on Figure 1, a core 23 formed from wood, for example. The core 23 extends from the band 20 on the outside of the shoe 10 across the shank portion 15b and rests on the cut away section 22. A strip of clay-like material 22a such as extruded or rolled plastic clay may be provided on the section 22 of the band 20 to accommodate any irregularities between it and the core 23.

It may be desirable to lay a two-faced pressure sensitive tape 24 around the counter 14 under the shoulder 21 to prevent the band 20 from slipping out of place on the shoe 10 as well as for providing a tight seal between the shoulder 21 and the counter 14. Alternatively, a contact sensitive cement may be painted on this area to perform the same function.

The heel molding band 20, as well as the other bands to be described below, may be formed by laminating, extruding or casting natural or synthetic rubber or other similar rubbery materials that are resistant to the material being molded. For example, the heel band 20 may be formed by bonding a strip of synthetic rubber in the shape of the shoulder 21 to a larger strip of such rubber having the desired configuration to provide the band 20. In further regard to the heel band 20, it should be understood that the shoulder 21 may be omitted therefrom, the band 20 contacting the counter 14 directly or through the layer of tape or cement 24.

Formed in a manner similar to that described in connection with the heel molding band 20 is a sole molding band 25 extending from a position 27 adjacent to the outside of the shank portion 15b over a section of the band 20 around the welt 16 to a position 28 adjacent to the inside of the shank portion 15b over a further section of the band 20. A shoulder 26 extends laterally from the lower edge of the band 25. In order to fit snugly in the V-shaped recess between the welt 16 and the upper sections of the shoe 10, the shoulder 26 is preferably tapered from its lateral surface to the outside face of the band 25 as clearly shown in Figure 2. The shoulder 26 engages the welt 16 adjacent to the sole portion 15a and extends a short distance adjacent to the shank portion 15a on both sides of the shoe 10 to slightly overlap the tapering portions 21a and 21b of the shoulder 21.

The ends of a strap 29 are fastened around the upper side of the counter 14 by a buckle 30, the strap 29 extending from the buckle 30 through a slot 31 in the end of the band 25 on the outside of the shoe 10, around the heel band 20, through a slot 32 in the other end of the band 25 on the inside of the shoe 10 and to the buckle 30. It is readily apparent that the strap 29 holds the sole band 25 in place and also aids in maintaining the heel band 20 in its proper position.

A spring metal clamp 33 carrying studs 34 and 35 on each side spans the shoe top to engage the band 25 on either side of the shank portion 15b. The clamp 33 functions to urge the band 25 inwardly against the overlapped portions of the heel band 20 and conform both of the molding bands to the configuration of the shoe 10. A further spring metal clamp 33a may extend across the heel portion 15c to press the heel band 20 against the counter 14.

Referring next to Figures 9 to 13, inclusive, the shoe 10 and the molding bands 20 and 25 are shown with certain additional apparatus for completing the molding of a sole 10a and a heel 10b on the shoe 10. Thus, in Figures 9, 11 and 12, the shoe 10 is positioned on the last 17 which is supported by a hinged rod 17a, the bands 20 and 25 and the core 23 being mounted thereon. Sole and heel covers 36 and 37 and a clamp 38 are secured to the upper side of the core 23 by inserting a screw 39 into the hole 23a through a slot 38a in the clamp 38. One end of the clamp 39 is suitably bent to extend up and over the outer face of the band 20 to hold the core 23 in close proximity to the inner face thereof and a predetermined distance above the shank portion 15b. The entire assembly is further secured to the shoe 10 by lashings 40 and 41 preferably formed from elastic bands.

Affixed to the sole cover 36 by cementing, for example, is a tread former 42 shown as a corrugated pattern which may be prepared from paper mache, cardboard or other suitable materials. Obviously, any desirable tread pattern may be placed on the tread former 42. The heel cover 37 also carries a similar tread former 43, the heel cover 37 preferably being constructed in two pieces 37a and 37b hinged together by a cloth tape or similar element 37c.

The sole cover 36 is preferably cut from a transparent material such as Celluloid, for example, to permit observations to be made as the molding process progresses. The heel cover 37 may be fiber board or good quality cardboard and is provided with a slot 37d to permit adjustment of the assembly to various sized shoes.

A further lashing 44, preferably a rubber band, is fastened in an opening 36a in the front section of the sole cover 36 and extends over a pin 45 disposed in the sole band 25 adjacent the shank portion 15b and a similar pin on the other side thereof (not shown). Obviously, the sole cover 36 may be secured over the molding band 26 in any other convenient manner.

In preparing for the process of molding the sole 10a and heel 10b to the shoe 10, the insole 15 and the welt 16 are preferably roughened, this function being accomplished, for example, by means of a wire brush, an abrasive wheel, sandblasting or other similar methods. If the use of a tape or cement 24 has been deemed desirable, it is next placed on the counter 14 and subsequently, the bands 20 and 25 are secured to the shoe 10 by means of the strap 29 and the clamps 33 and 33a. Next, the strip 22a of plastic clay, if it is to be employed, may be placed on the cut away portion 22 of the band 20. The core 23 is then pressed into place, the plastic clay 22a filling out any irregularities between the cut out portion 22 and the core 23.

With the molding bands 20 and 25 and the core 23 securely in place, a bonding and filler compound may be spread over the entire shoe bottom, such compound consisting, for example, of 25% natural latex, 5% filler, and 5% tackifying resin in emulsified form. If desired, the bonding and filler compound may be poured over the shoe bottom and the entire assembly rotated or tilted in order to fill any small openings between the mold and the various portions of the shoe 10 as the compound coagulates. One or more coats may be necessary to properly prepare the shoe bottom for subsequent operations. Obviously, various other bonding and filler compounds may be employed in the invention depending upon the material selected for the sole and heel.

After the bonding and filler compound has partially dried or set, a casting compound 46 in a container 47 is poured into the mold on the bottom of the shoe 10. During such pouring, care must be taken to prevent voids, bubbles, etc., in the compound until the entire front sole area is filled. The sole cover 36 carrying the tread former 40 may then be fastened by the lashing 44 and pressed down into the casting compound as the shoe 10 is tilted slightly forward, as shown in Figure 11, to completely fill the mold formed by the sole band 25.

The heel portion may then be filled with the casting compound 46 from the dispenser 47, as shown in Figure 11, the shoe 10 leveled, and the tread former 41 swung downwardly against the compound 46 as shown in Figure 12 to provide a heel pattern. Depending upon the nature of the casting compound, it may be desirable to provide certain conditions of heat and pressure to accelerate the setting process after which the molding bands 20 and 25 may be removed and the shoe 10 with the sole and heel thereon dried. In certain instances, it may be desirable to exert further pressure against the sole 10a and the heel 10b to secure a stronger bond between the casting compound and the shoe bottom.

The casting compound selected must have the characteristics necessary to provide soles and heels resistant to wear. Natural rubber latex and various synthetic rubbers such as the polysulfide polymers are examples of compounds exhibiting such characteristics. It will be understood that the final hardening, setting, vulcanization, polymerization, etc. of the casting compound will be determined by its composition. Thus, certain conditions of heat and pressure may be required in some instances while in others, simple air drying may be sufficient. In some circumstances, high energy irradiation of the type emitted by an atomic pile may be employed to vulcanize rubber compounds or cause cross-linking in certain long-chain synthetic compounds.

Under some conditions, it may be preferable to construct the band mold on a shoe, position the core thereon and mold the sole and heel without employing the sole and heel covers 36 and 37. Thus, a scraper could be used to level the casting compound and the tread, if any, formed by scoring the compound before the final setting thereof.

In the event the joints between the molding bands 20 and 25 and the shoe are relatively free from small openings, a high viscosity casting compound may be employed which will act to some extent as a filler and will be self-bonding. As a result, the bonding and filler compound may be eliminated. However, the conditions must be optimum to proceed in the last-mentioned manner, such conditions often including a new shoe provided with well fitted molding bands.

Figure 7B:
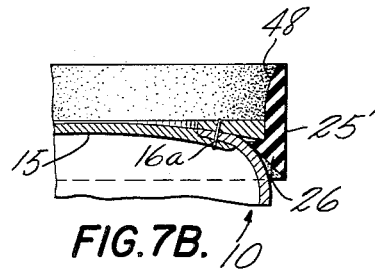
Figures 7B and 7C are fragmentary sections, similar to Figure 7A, illustrating two modified forms of the molding band in position on a welted shoe in accordance with the invention.

Although synthetic rubber produced from polysulfide polymers has approximately 2 percent shrinkage casting compounds produced with a natural rubber base are subject to as much as 40 percent shrinkage. Compensation for such shrinkage must be provided if high quality soles and heels are to be produced. Referring to Figure 7B, it it apparent that a molding band 25' is formed with its upper inner face 48 arcuately cut back to permit a greater quantity of the casting compound 46 to flow into the mold. Upon shrinkage of the compound 46, the face 48 is so designed that it will be drawn into a vertical position.

Figure 7C:
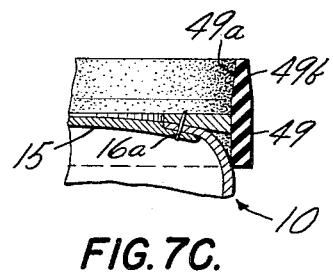

Examining Figure 7C, a molding band 49 having a different profile from those previously described is shown in position on a welted shoe 10. The band 49 lacks a shoulder but may be employed in the same manner as the bands 20 and 25. If desired, two-faced pressure sensitive tape or a coating of cement may be inserted between the band 49 and the welt 16 and other portions of the shoe to secure the band 49 thereon. Both the upper inner and outer faces 49a and 49b of the band 49 are beveled to compensate for the shrinkage of the casting compound employed. An advantage afforded by the molding band 49 is its ability to be used to form a mold on either right or left shoes. It will be evident that the band 49 will be suitably formed to receive a core 23 in a manner similar to that described in connection with the band 20.

Figure 8A:
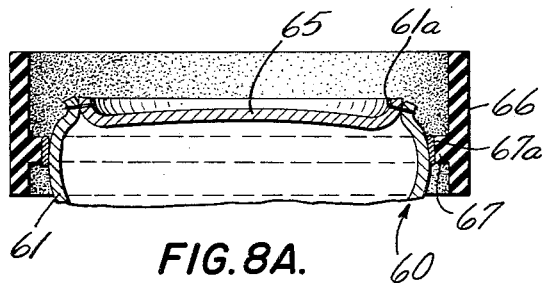
Figure 8A is a transverse section of the mold and shoe taken on the view line 8A—8A in Figure 4 looking in the direction of the arrows.

The above molding methods and apparatus have been described in connection with a welted shoe 10. However, the invention contemplates forming soles and heels not only on welted but on unwelted shoes, new or used, the term shoes including boots, slippers and other types of footwear. The invention as applied to an unwelted shoe 60 will be described in connection with Figures 4 to 6 and 8A. In this embodiment of the invention, the unwelted shoe 60 comprises an upper 61, a vamp 62, a cap 63, a counter 64 and an insole 65 including front, shank and heel portions 65a, 65b and 65c, respectively. The upper 61 is fastened to the insole 65 by stitching 61a as illustrated in Figure 8A.

In molding a sole and heel on the unwelted shoe 60, it is often preferable to provide for a short lateral extension thereof to simulate a welted shoe. To accomplish this construction, a molding band 66 is formed with a shoulder 67 thereon adapted to engage the lower periphery of the shoe 60. The portion of the band 66 extending below the shoulder 67 provides for greater rigidity but may, of course, be omitted. A two-faced sensitive tape 67a is preferably inserted between the shoulder 67 and the shoe 60 to prevent slippage of the band 66 and to prevent leakage of the casting compound therebetween.

In order to fit the band 66 smoothly to the shoe 60, the shoulder 67 is tapered into the inner face of the band 66 at one end 68 adjacent to the rear of the shank portion 65b on the inside of the shoe 60. The end 68 of the band 66 is then extended toward the front of the shoe 60, tapering outwardly to the inner face of the band 66 at the position 69 as well as tapering into the upper lateral surface of the shoulder 67. The other end 70 of the band 66 overlaps the end 68 on the inside of the shank portion 65b for a short distance and has a slot 71 formed therein. Inserted in the slot 71 is a connector 72 joined to a strap 73 leading around the heel portion of the band 66 and connected to a clamp 74 at a junction point 75.

The clamp 74 is in the nature of a double clamp formed, for example, from spring steel members 76, 77 and 78. The C-shaped member 76 spans the shoe 60 to urge the band 66 against the counter 64 adjacent to the heel portion 65c. Extending from the member 76 are the members 77 and 78 which function to press the band 66 against the inside and outside of the shank portion 65b. A further spring clamp 79 spans the top of the shoe to urge the band 66 into engagement with the shoe 60 adjacent to the shank portion 65b at the narrowest section thereof. These clamping members cause the molding band 66 to closely follow the shoe contours.

In order to receive a core 80, the band 66 is formed with cut away sections 81 and 82 adjacent the outside and inside of the shank portion 65b, respectively. Strips of plastic clay 83 and 84 may be placed thereon to fill any irregularities between the band 66 and the core 80. It will be noted that the manner of placing the core 80 in the mold differs from that shown in Figures 1 and 2 in that both sides of the molding band 66 are cut away. This has proved advantageous in some instances and it will be understood that the bands 20 and 25 (Figure 1) adjacent to the shank portion 15b on the outside of the shoe 10 may be cut away if desired. A further distinction relating to the cores is in the shape of the core 80 which is actually two sided in order to permit its use with either a right or a left shoe. Of course, it is apparent that the core 23 could be constructed in a similar manner.

The sole and heel is molded on the shoe 60 in a manner similar to that described in connection with Figures 9 to 13, a necessary change being, of course, the provision of sole and heel covers that are modified to conform to the core 80. It is evident that a core similar to the core 23 together with the sole and heel covers 36 and 37 could also be employed with the embodiment of the invention shown in Figures 4 and 5. Thus, if only one cut out section 82 was provided on the band 66 to receive the core 23, the clamp 38 would engage the outside face of the band 66 on the opposite side of the shoe 60.

It will be understood that the upper inner face of the band 66 may be suitably tapered, as shown in Figure 7B at 48, to compensate for the shrinkage of the casting compound as described above. Further, it is apparent that the molding band 66 may be employed on a welted shoe such as shown in Figures 1 and 2, the shoulder 67 fitting under the welt 16.

Figure 8B:
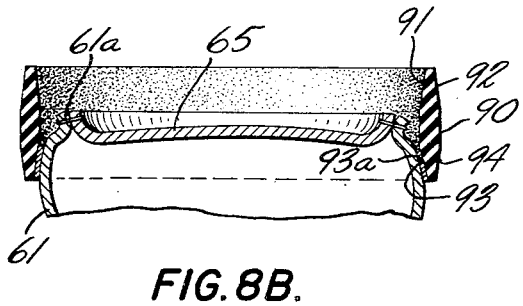
Figure 8B is a transverse section, similar to Figure 8A, illustrating a modified form of molding band on an unwelted shoe in accordance with the invention.

In still a further embodiment of the invention illustrated in Figure 8B, a single molding band 90 may extend completely around the unwelted shoe 60 as described in connection with Figures 4 and 5, but the shoulder 67 has been eliminated and the upper inner and outer faces 91 and 92 of the band 80 tapered to compensate for shrinkage of the casting compound. Since both faces are tapered, it will be possible to employ the molding band 90 on both right and left shoes by merely reversing it. Also, the lower inner face 93 may be suitably beveled to better fit the inclined upper 61 of the shoe 60. The lower outer face 94 is also beveled so that the band 90 may be utilized on both left and right shoes. If desired, a pressure sensitive tape 93a may be inserted between the shoe 60 and the band 90 to securely position it on the shoe 60 and prevent leakage of the casting compound therebetween.

Figure 8C:
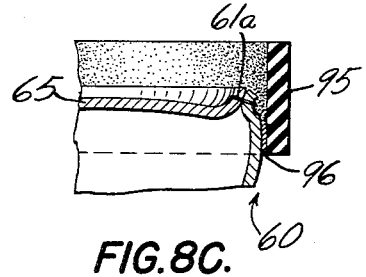
Figure 8C is a fragmentary section, similar to Figure 8A, illustrating another modified form of molding band on an unwelted shoe in accordance with the invention.

Referring to Figure 8C, a molding band 95 shown in place on the unwelted shoe 60 may be formed from a rectangular strip of resilient material. In order to smoothly fit the band 95 around the unwelted shoe 60 or, if desired, to the welted shoe 10, one end thereof should be tapered as illustrated at the position 69 in Figure 4 or at the position 18 in Figure 1. Further, a two-faced pressure sensitive tape 96 may be employed with the band 95.

It will be understood that the band molds may be formed on the shoes 10 or 60 by resilient bands that are provided with a shoulder on the sole portion alone, the heel portion alone or on both portions. Furthermore, these bands may extend beyond the bottom of the shoe any desired distance to form thick or thin soles and heels and may, of course, form the heel considerably thicker than the sole, for example.

Obviously, two-faced pressure sensitive tape or cement may be inserted between any of the molding bands described and the uppers of the welted or unwelted shoes 10 and 60 to securely position the band on the shoe and prevent leakage of the casting compound therebetween. Furthermore, the band may be cut away at a single side as shown in Figures 1 and 2 to receive the core or it may be cut out on both sides adjacent the shoe shank as shown in Figures 4 and 5. It will also be apparent that the various molding bands described may be applied in two sections to either a welted or unwelted shoe as shown in Figures 1 and 2 or may be affixed to such shoes in a single section as illustrated in Figures 4 and 5.

It will be understood that the above described embodiments of the invention are illustrative only and modifications thereof will occur to those skilled in the art. Therefore, the invention is not to be limited to the specific apparatus disclosed herein but is to be defined by the appended claims.

I claim:

1. Shoe sole and heel molding apparatus comprising resilient rubbery molding band means, means adapted to clamp said band means to a shoe adjacent to the bottom and along the periphery thereof, said band means extending a predetermined distance beyond the bottom of said shoe and having a cut away section on at least one side of the shoe adjacent to the shoe shank, and a core disposed in the cut away section and extending across the shank.

2. Apparatus as defined in claim 1 wherein adhesive means are provided between at least a portion of said band means and the shoe.

3. Apparatus as defined in claim 1 wherein a resilient shoulder is formed on at least a portion of said band means adjacent to the shoe, said shoulder engaging the shoe.

4. Apparatus as defined in claim 1 wherein the shoe is welted, and means forming a resilient shoulder on said band means for engaging the upper side of the welt.

5. Apparatus as defined in claim 1 wherein the inner face of the band means extending beyond the shoe bottom is tapered towards the outer face of the band means.

6. Apparatus as defined in claim 1 wherein the inner and outer faces of said band means extending beyond the shoe bottom are tapered toward each other.

7. Apparatus as defined in claim 1 wherein the face of said band means engaging the shoe is beveled to permit said band means to follow the shoe upper contours.

8. Apparatus as defined in claim 1 wherein a strip of clay-like material is disposed between said core and said cut away section.

9. Apparatus as defined in claim 1 wherein cover means are provided to engage said band means and enclose the shoe bottom.

10. Apparatus as defined in claim 9 wherein tread formers are provided on said cover means.

11. Shoe sole and heel molding apparatus comprising resilient rubbery molding band means, means adapted to clamp said band means to a shoe adjacent to the bottom and along the periphery thereof, said band means extending a predetermined distance beyond the bottom of said shoe and having a cut away section on at least one side of the shoe adjacent to the shoe shank, a core disposed in the cut away section and extending across the shank, means forming a resilient shoulder on at least a portion of said band means, adhesive means provided between at least a portion of said shoulder and the shoe, the inner face of said band means that extends beyond the shoe bottom being tapered toward the outer face of said band means, and cover means formed to engage said band means and enclose the shoe bottom.

12. Apparatus as defined in claim 11 wherein the shoe is welted and the shoulder engages the upper side of the welt.

13. Apparatus as defined in claim 11 wherein a strip of clay-like material is disposed between said core and said cut away section.

14. A shoe bottoming method comprising affixing band means to the shoe adjacent to the bottom and along the periphery thereof, the band means extending a predetermined distance beyond the shoe bottom, positioning a core in a cut away section of the band means, said core extending across the shank of the shoe, and pouring a casting compound into the mold.

15. A shoe bottoming method comprising roughening the shoe bottom, clamping at least one molding band on the shoe adjacent to the bottom and along the periphery thereof, said band extending a predetermined distance beyond the shoe bottom, positioning a core in a cut away section of the band, said core extending across the shank of the shoe, pouring a bonding and filler compound into the mold formed by the band and core, and pouring a casting compound into the mold.

16. A shoe bottoming method comprising roughening the shoe bottom, clamping a pair of overlapping molding bands on the shoe adjacent to the bottom and along the periphery thereof, the bands extending a predetermined distance beyond the shoe bottom, positioning a core in a cut away section of the bands, said core extending across the shank of the shoe, pouring a bonding and filler compound into the mold formed by the bands and core, and pouring a casting compound into the mold.

17. A method as defined in claim 16 including the step of disposing a strip of clay-like material between the cut away section and the core.

18. A shoe bottoming method comprising roughening the shoe bottom, clamping at least one molding band to the shoe adjacent to the bottom and along the periphery thereof, the band extending a predetermined distance beyond the shoe bottom, positioning a core in a cut away section of the band, said core extending across the shank of the shoe, pouring a bonding and filler compound into the mold formed by the band and core, pouring a casting compound into the sole section of the mold, pressing a sole tread formed into the casting compound in the sole section, pouring the casting compound to completely fill the mold, and pressing a heel tread former into the casting compound in the heel section of the mold.

19. A method as defined in claim 18 including the step of disposing a strip of clay-like material between the cut away section and the core.

References Cited in the file of this patent

UNITED STATES PATENTS

| | | |
|---|---|---|
| 833,701 | Strait et al. | Oct. 16, 1906 |
| 1,535,584 | Dorfman | Apr. 28, 1925 |
| 2,178,086 | Szerenyi | Oct. 31, 1939 |
| 2,330,989 | Nevills | Oct. 5, 1943 |
| 2,351,529 | Luxenburger et al. | June 13, 1944 |
| 2,406,005 | Doherty | Aug. 20, 1946 |
| 2,406,359 | Doherty | Aug. 27, 1946 |
| 2,470,089 | Booth | May 17, 1949 |
| 2,638,633 | Root | May 19, 1953 |

FOREIGN PATENTS

| | | |
|---|---|---|
| 428,585 | Great Britain | May 15, 1935 |